United States Patent
Bureau et al.

(10) Patent No.: US 7,736,484 B2
(45) Date of Patent: Jun. 15, 2010

(54) METHOD FOR GRAFTING AND GROWING A CONDUCTIVE ORGANIC FILM ON A SURFACE

(75) Inventors: Christophe Bureau, Suresnes (FR); Edouard Levy, Malakoff (FR); Pascal Viel, Meudon (FR)

(73) Assignee: Commissariat a l'Energie Atomique, Paris (FR)

( * ) Notice: Subject to any disclaimer, the term of this patent is extended or adjusted under 35 U.S.C. 154(b) by 1676 days.

(21) Appl. No.: 10/487,731

(22) PCT Filed: Aug. 27, 2002

(86) PCT No.: PCT/FR02/02939

§ 371 (c)(1),
(2), (4) Date: Feb. 23, 2004

(87) PCT Pub. No.: WO03/018212

PCT Pub. Date: Mar. 6, 2003

(65) Prior Publication Data

US 2004/0248428 A1    Dec. 9, 2004

(30) Foreign Application Priority Data

Aug. 28, 2001 (FR) .................................. 01 11164

(51) Int. Cl.
*C25D 11/00* (2006.01)

(52) U.S. Cl. .................................................. 205/317

(58) Field of Classification Search .................. 205/157, 205/317, 413, 414, 419
See application file for complete search history.

(56) References Cited

U.S. PATENT DOCUMENTS 4,640,749 A    2/1987   Naarmann et al.
6,517,858 B1   2/2003   Le Moel et al.
7,182,822 B2 * 2/2007   Pinson et al. ............... 148/241

FOREIGN PATENT DOCUMENTS

| EP | 0038244 | 10/1981 |
| EP | 0 229 563 A1 | 7/1987 |
| FR | 2 672 307 | 7/1992 |
| FR | 2672307 A1 * | 8/1992 |
| FR | 2 761 377 | 2/1998 |
| WO | WO 00/29043 | 5/2000 |
| WO | WO 0159178 A1 * | 8/2001 |

OTHER PUBLICATIONS

Reference O is the Abstract Only. The reference was 77 pages long and too big to download as a PDF on the EPO website.*
Arwin, H. et al., *Dielectric Function of Thin Polypyrrole and Prussian Blue Films by Spectroscopic Ellipsometry*, Synthetic Metals, 1983, pp. 309-316, 6, Elsevier Sequoia, The Netherlands.

(Continued)

*Primary Examiner*—Edna Wong
(74) *Attorney, Agent, or Firm*—Brinks Hofer Gilson & Lione (57) ABSTRACT

The present invention relates to a process for grafting and growing a conductive organic film on(to) an electrically conductive or semiconductive surface in which the grafting and growing of the film are performed simultaneously by electroreduction of a diazonium salt that is a precursor of the said film on(to) the said surface cathodically polarized at a potential greater than or equal, in absolute value, to the electroreduction potential of the diazonium salt relative to a reference electrode.

The invention finds an application especially in the protection of surfaces, the manufacture of localized conductive coatings, of chemical sensors in the fields of chemistry and molecular biology, the manufacture of biomedical equipment, etc.

19 Claims, 6 Drawing Sheets

OTHER PUBLICATIONS

Bureau, Christophe et al., *Electrochemistry as a Tool to Monitor Lewis Acid-Base Reactions between Methacrylonitrile and Metallic Surfaces: A Theoretical and Experimental Proposal*, J. Adhesion, 1996, pp. 101-121, vol. 58, Overseas Publishers Association, Amsterdam, The Netherlands.

Bureau, Christophe et al., *On a modeling of voltage-application to metallic electrodes using density functional theory*, J. Chem Phys., Jun. 1, 1997, pp. 8821-8829, vol. 106, No. 21, American Institute of Physics.

Bureau, Christophe et al., *Synthesis and Structure of Polymer/Metal Interfaces: a Convergence of Views between Theory and Experiment*, Journal of Surface Analysis, 1999, pp. 159-170, vol. 6, No. 2.

Guedon, Philippe et al., *Characterization and Optimization of a Real-Time, Parallel, Label-Free, Polypyrrole-Based DNA Sensor by Surface Plasmon Resonance Imaging*, Analytical Chemistry, Dec. 15, 2000, pp. 6003-6009, vol. 72, No. 24, American Chemical Society, Published on the Web Nov. 14, 2000.

Kim, Dongrae et al., *Polypyrrole Film Studied by Three-Parameter Elllpsometry*, Elllpsometry on Polypyrrole, 1996, pp. 707-712, vol. 17, No. 8, Bull. Korean Chem. Soc.

Kim, Y. T. et al., *Real Time Spectroscopic Ellipsometry: In Situ Characterization of Pyrrole Electropolymerization*, J. Electrochem. Soc., Nov. 1991, pp. 3266-3275, vol. 138, No. 11, The Electrochemical Society, Inc.

* cited by examiner

METHOD FOR GRAFTING AND GROWING A CONDUCTIVE ORGANIC FILM ON A SURFACE

TECHNICAL FIELD

The present invention relates to a process for grafting and growing a conductive organic film on(to) a surface, and to the film obtained by the said process. The invention also relates to the use of the process and of the film of the present invention in various applications such as the protection of surfaces against chemical attack, the manufacture of localized conductive coatings, the manufacture of chemical sensors, for example in the fields of chemistry and molecular biology, the manufacture of biomedical equipment, etc.

According to the invention, these films may be obtained on any electrically conductive or semiconductive surface, by electro-reduction of diazonium salts, and in particular of aryldiazonium salts, in an organic solvent or in aqueous solution.

The electro-reduction may be performed under voltammetric, potentiostatic or intensiostatic conditions. It produces organic films grafted onto the working surface, the thickness of which is greater than one monocular monolayer.

The expression "thickness greater than one molecular monolayer" means thicknesses that are greater or even very much greater than the size of the precursor molecule, taken in its largest dimension, which gave rise to the electro-grafted organic film. The working examples specified hereinbelow show, for example, that it is possible, starting with 4-nitrophenyldiazonium tetrafluoroborate with a size of about 1.5 nm, to obtain films with a thickness of 100 nm or more.

In the text hereinbelow, the references in square brackets ([ ]) refer to the attached list of references.

PRIOR ART

Conductive polymers are currently undergoing huge growth. They have recently been honoured with the Nobel Prize for chemistry awarded to Mac Diarmid et al. [1]. These polymers may be obtained in film-forming form on conductive surfaces by electropolymerization of precursors such as pyrrole, aniline, thiophene, EDOT, etc. It is to these compounds that we will make reference when mention is made hereinbelow of "conventional conductive polymers".

This electropolymerization consists of an electro-oxidation of the precursor, which can then dimerize to form an electro-oxidizable compound, which may thus itself be electro-oxidized before dimerizing, and so on. The formation of a film proceeds by precipitation of the conductive polymer on the surface, when a critical concentration is obtained at the surface/solution interface.

Conductive polymer films obtained by electropolymerization are therefore not grafted onto the surface.

Since conventional conductive polymer films are made by means of electro-oxidation of the precursors and of their successive oligomers, they can only be obtained by anodic polarization of the surface on which it is desired to deposit the film: since noble alloys or metals are the only ones that can tolerate anodic polarization without being oxidized and without their surface dissolving into the solution, conventional conductive polymer films can be formed only on surfaces of noble alloys or metals, such as gold or platinum.

Thus, a technical solution for producing conductive organic coatings on all types of surface, including, in particular, on non-noble surfaces, has not been proposed to date.

In addition, there are at the present time very few technical solutions for obtaining a conductive organic coating that is chemically grafted onto the surface, even onto noble surfaces, and which can thus conserve its conductive properties, for example under the effect of subsequent attack, chemical or other.

U.S. Pat. No. 5,350,323 mentions that it is possible to obtain an organic coating with an electrical contact resistance of less than 10 ohms by grafting, via cathodic electropolymerization, a vinylic polymer film, which is all the better if this polymer film then undergoes a post-treatment, either thermally or using ionizing radiation.

However, this process does not satisfy the technical difficulties mentioned above, since the films obtained after the electro-grafting step are intrinsically insulating. The electrical conduction of the film is entirely due to the thermal or ionizing post-treatment steps, which are completely uncorrelated to the electro-grafting step.

DESCRIPTION OF THE INVENTION

The present invention provides a process for grafting and growing a film of a conductive organic polymer on(to) an electrically conductive or semiconductive surface, which constitutes a solution to the abovementioned problems of the prior art.

The process of the present invention is performed by electro-reduction of at least one diazonium salt that is a precursor of the said organic film, comprising a step of grafting and growing the film by application of at least one protocol consisting of the electro-reduction of the said diazonium salt on(to) the said surface electrically polarized to at least one working potential that is more cathodic than the electro-reduction potential of the diazonium salt, the said potentials being measured relative to the same reference electrode.

One of the important points of the invention is that these films are obtained by cathodic polarization of the surface. This polarization is measured relative to a reference electrode, for example a silver electrode.

In the prior art techniques, the conductive polymer films, such as those based on pyrrole, aniline, thiophene, EDOT, etc., were obtained anodically. This allowed the manufacture of films on noble surfaces, such as gold and platinum, but did not make it possible to envisage the manufacture of conductive organic films on conductive or semiconductive surfaces of all types, and in particular on non-noble surfaces.

The process of the present invention gives access both to surfaces of noble metals, such as gold, platinum, etc., and to "non-noble" surfaces, such as surfaces containing reducible oxide, a graphite surface, a conductive or semiconductive organic surface, a surface of an alloy, a surface of one (or more) conventional conductive polymer(s), such as a surface based on pyrrole, on aniline, on thiophene, on EDOT, on acetylene or on polyaromatics, etc., a surface of an intrinsic or doped semiconductor, and any combination of these compounds.

In addition, the process of the present invention consists, unlike the processes of the prior art, in producing conductive coatings, i.e. delocalized electronic states on an initial surface that has delocalized electronic states.

The films obtained also have the advantage of standing rinsing, and especially ultrasonic rinsing, and are chemically grafted onto the surface of the working electrode.

According to the present invention, the conductive organic films may be obtained by electro-reduction of a diazonium salt or of a mixture of diazonium salts of generic formula $R'-N_2^+$, $X^-$, in which the group $R'$ contains one or more aromatic ring(s) and/or one or more unsaturated group(s) capable of delivering conductive structures, and X⁻ is a counterion.

According to the invention, the groups R' may comprise an organic or mineral group chosen from the following groups: nitro, fluoro, bromo, chloro, iodo, thiocyanato, sulphate, sulphonate, sulphonium salts, phosphate, phosphonate, phosphonium salts, diazonium salts, amine, ammonium, alcohol, aldehyde, ketone, carboxylic acid, ester, amide, nitrile, anhydride and acid halide, and also from alkyl, alkenyl, alkynyl, aryl, naphthyl, anthryl, pyrryl or polyaromatic groups of higher degree, themselves containing one of these groups.

According to the present invention, R' may be chosen, for example, from compounds a) to f) below:

in which, independently:

R, R$^1$ and R$^2$, when they are present, independently represent any organic or mineral group chosen, for example, from the following groups: nitro, fluoro, bromo, chloro, iodo, thiocyanato, sulphate, sulphonate, sulphonium salts, phosphate, phosphonate, phosphonium salts, diazonium salts, amine, ammonium, alcohol, aldehyde, ketone, carboxylic acid, ester, amide, nitrile, anhydride, and also from alkyl, alkenyl, alkynyl, aryl, naphthyl, anthryl, pyrryl or aromatic groups of higher degree, containing one of these groups and/or other organic functions, for instance an amine, an ammonium, an alcohol, an aldehyde, a ketone, a carboxylic acid, an ester, an amide, a nitrile, an anhydride or an acid halide; and X⁻ is a counterion.

Specifically, all the structures R' containing mono- or polyaromatic groups, of strictly benzenic nature or comprising hetero atoms, for instance pyridine or ortho-phenanthroline, or alternatively those comprising triple bonds, for instance those given above as examples, may be used to prepare electro-grafted conductive organic films cathodically according to the present invention.

Mixtures of these various diazonium compounds may also be used according to the present invention.

In addition, for example when the structures R' comprise one or more aromatic heterocycle(s), such as pyridine or ortho-phenanthroline, it may be advantageous to include metal salts into the synthetic medium, so that they are complexed by the said heterocycles, provide additional doping and can contribute towards further reinforced electrical conductivity.

Each of these aromatic rings may optionally be substituted, in any of these positions. Electro-grafted conductive organic films have been able to be obtained by the inventors with both substituted aromatic and unsubstituted aromatic diazonium compounds.

According to the invention, the diazonium salts may be, for example, in the form of tetrafluoroborates, halides, sulphates, phosphates, carboxylates, perchlorates or hexafluorophosphates or a mixture of these salts.

From the results mentioned below, it is seen that the increase in thickness of the film according to the process of the present invention depends especially on the diazonium salt used. However, it may be estimated that the resolution on the adjustment of the thickness according to the process of the invention is of the order of a few nanometres per sweep.

In addition, irrespective of the type of molecule chosen to perform the electro-grafting, according to the invention a support electrolyte may be added to the reaction medium to facilitate the passage of the electrical current through the solution, for instance tetraethylammonium perchlorate.

According to the invention, the electro-reduction may be performed on a conductive cathode, preferably in an organic or aqueous solution, containing the diazonium salt(s), at a concentration that may be, for example, between $10^{-4}$ and 1 mol/l.

The grafting and growth of the film take place on the cathode as soon as its potential is higher, as an absolute value, than the electro-reduction potential of the diazonium salt, relative to a reference electrode.

This potential varies as a function of the nature of the organic substituent R'. For 4-nitrophenyldiazonium tetrafluoroborate, for example, the electro-reduction of the diazonium salt takes place at a potential in the region of E=−0.1 V/(Ag⁺/Ag), as shown in the attached FIG. 1.

The inventors have observed that it is possible to obtain rapid grafting of uniform thickness, surprisingly, by applying to the surface onto which the film is grafted a more cathodic potential than the electro-reduction potential of the diazonium compound.

Figure 1:
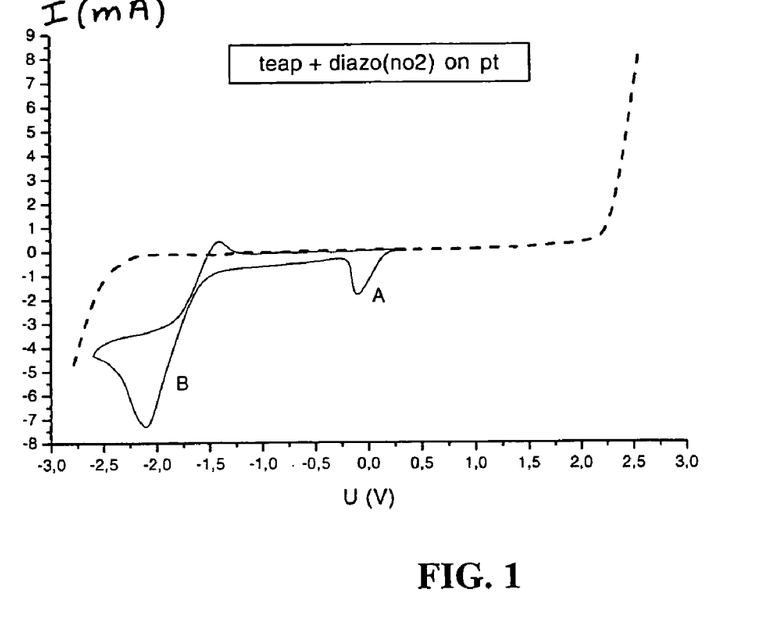
FIG. 1: Graphical representation of the voltammetric responses of a solution containing $10^{-4}$ mol/l of 4-nitrophenyldiazonium tetrafluoroborate in acetonitrile, in the presence of $5 \times 10^{-2}$ mol/l of TEAP, on a platinum electrode. The counterelectrode is also a platinum electrode, and the reference electrode is an $Ag/Ag^+$ electrode.

In the example of FIG. 1, the inventors have chosen, for example, to work under voltammetric conditions, with a stopping potential at −2.9 V/(Ag⁺/Ag), as detailed in Example 1 below. In this figure, for example, the zone of adequate potential is located on the cathodic branch above, as an absolute value, +0.3 V/(Ag$^+$/Ag), since this value is that of the foot of the electro-reduction peak of the diazonium salt. In this figure, the potential sweeps were performed between +0.3 and −2.9 V/(Ag$^+$/Ag).

According to the invention, the electro-reduction potential of the diazonium salt may be applied in various ways, known as "potential application protocols" below:

either by cathodically polarizing the working electrode at the adequate value relative to a reference electrode, for example a silver electrode, i.e. to the value defined according to the present invention. This is a protocol applied in referenced potentiostatic mode;

or by cathodically polarizing the working electrode relative to a counterelectrode, such that its potential, measured relative to a reference electrode, is correct, i.e. as defined according to the present invention. This is a protocol applied in potentiostatic mode;

or by applying a current in an electrical circuit, of which the surface on(to) which the film is to be grafted and grown is one of the electrodes, preferably the cathode, such that the potential of this surface is as defined according to the present invention. This is a protocol applied in intentiostatic mode.

For each mode of application of the potential in these various protocols that may be used according to the process of the present invention, in the sense defined above, it is also possible, according to the invention, to vary the "application protocol", for example in the manner described below:

either the potential (potentiostatic modes) or the current (intentiostatic mode) are applied so as to have a fixed value: a "fixed-potential protocol" or a "fixed-current protocol" is thus performed, respectively, for a given synthesis time;

or the potential (potentiostatic modes) or the current (intentiostatic mode) applied are variable over time. It is possible, for example, to vary them from an initial value to a final value, with a constant or non-constant sweep speed, as, for example, in the case of the example of FIG. 1. Once the final value has been reached, the same protocol may be applied to redescend to the initial value.

Thus, in the process of the present invention, at least one protocol may be applied in potentiostatic mode and/or in intentiostatic mode.

Thus, in the process of the present invention, in at least one protocol, the working potential may be variable and/or a variable working current may be applied to the said surface.

In addition, according to the invention, the film may be grown by successive application of several protocols, chosen independently from protocols with fixed or variable applied working potential and protocols with fixed or variable applied working current, each protocol being applied to the said surface for a given duration that is identical to or different from that of the other protocols.

For example, according to the invention, all the protocols applied to the said surface may be identical.

For example also, according to the invention, the grafting and growth of the film may be obtained by a combination of protocols with fixed or variable applied potential and protocols with fixed or variable applied current.

For example also, in at least one of the applied protocols, the potential of the said surface may be applied so as to form a triangular potential pulse.

For example also, in at least one of the applied protocols, a triangular current pulse may be applied to the said surface.

For example also, in at least one of the applied protocols, the potential of the said surface may be applied so as to form a square potential pulse.

For example also, in at least one of the applied protocols, a square current pulse may be applied to the said surface.

The inventors have demonstrated, specifically, that it is possible, unexpectedly, to further increase the thickness of the organic film obtained by the process of the present invention, by repeating the protocols for applying the potential or the current described above, several times successively.

Thus, according to the invention, the growth in thickness of the film is obtained and may be controlled by applying one or more protocol(s), leading to the desired potential, until the desired film thickness is obtained.

According to the invention, the number of protocols applied to graft and grow the conductive organic film depends on the desired objective in the context of the present invention. It may vary, for example, from 1 to 10 000.

According to the invention, the duration of an application protocol also depends on the desired film thickness. It is generally, for example, from 1 to 500 seconds. A person skilled in the art will know how to adapt this duration according to the desired objective in the context of the present invention.

The process of the present invention makes it possible, unexpectedly, to manufacture covering films of adjustable thickness, thicker than the molecular monolayer, i.e. films whose thickness is greater than or very much greater than the largest dimension of the diazonium salt molecule used as precursor to obtain the film.

According to the invention, it is possible, for example, unexpectedly, to obtain films with a thickness of between 2 nm and 500 nm with 4-nitrophenyldiazonium tetrafluoroborate, whereas this molecule has a size of about 1.5 nm.

Specifically, when the synthetic conditions of FIG. 1 are used, for example, i.e. by applying a protocol in which a linear potential sweep of from +0.3 to −2.9 V/(Ag$^+$/Ag) and back is performed, at a sweep speed of 50 mV/s, on a strip of platinum dipped into a solution containing 10$^{-3}$ mol/l of 4-nitrophenyldiazonium tetrafluoroborate in a solution containing 5×10$^{-2}$ mol/l of TEAP in acetonitrile, the formation of a 3 nm film for 6 sweeps, and of a 100 nm film for 20 sweeps, is observed.

The inventors have demonstrated that, when the same experiment is performed with 4-bromobenzyldiazonium tetrafluoroborate, a 2 nm film is obtained after one sweep according to the process of the present invention. Under the same synthetic conditions, a procedure comprising 5 sweeps leads to 50 nm films.

The inventors think that this behaviour is a consequence of the molecular structures formed by the reaction of the diazonium compounds with the grafted layers, and which may lead to more or less conjugated constructions which are thus more or less electrically conductive.

The dependence as a function of the metallic substrate of origin on which the process is applied appears to be low since, by performing, for example, on a brass surface, 20 linear return potential sweeps of between +0.3 and −2.9 V/(Ag$^+$/Ag) at a speed of 50 mV/s, of a solution containing 10$^{-3}$ mol/l of 4-nitrophenyldiazonium tetrafluoroborate and 5×10$^{-2}$ mol/l of tetraethylammonium perchlorate in acetonitrile, a conductive organic film that is also 100 nm thick, the same as that obtained on platinum, is obtained.

The tests performed appear to indicate that, during a linear potential sweep protocol, the sweep speeds have little influence. Advantageously, according to the invention, sweep speeds of between 10 mV/s and 10 V/s will be used.

In any case, according to the invention, the working electrode, i.e. the surface onto which the film is grafted, and the counterelectrode may be in contact with the same solution or with different solutions during the electro-grafting.

The present invention thus also provides a process for grafting and growing a conductive organic film on(to) an electrically conductive or semiconductive surface by electro-reduction of a diazonium salt that is a precursor of the said organic film, comprising a first step of grafting and growing the film by applying at least one protocol consisting of the electro-reduction of a first diazonium salt on the said surface electrically polarized to at least one working potential that is more cathodic than the electro-reduction potential of the first diazonium salt, the said potentials being measured relative to the same reference electrode; and a second step of grafting and growing the film by electro-reduction of a second diazonium salt that is different from the said first diazonium salt.

The successive applications of identical or different protocols as described above may thus be performed either by working in the same solution of diazonium salt, or by changing the solution.

In any case, according to the invention, the working electrode and the counterelectrode may be placed in the a single compartment or in separate compartments during the electro-grafting.

The process of the present invention thus makes it possible to manufacture conductive organic films by electro-reduction of diazonium salts on electrically conductive or semiconductive surfaces of all types, and in particular on non-noble surfaces.

For films having redox markers such as nitro films, the inventors have demonstrated that the charge consumed to reduce all these markers is correlated to the thickness of the film. This characteristic of the present invention shows that the films obtained according to the process of the present invention are electrically conductive, and are formed by growing on themselves as the successive protocols are applied.

Besides the abovementioned advantages, the films obtained according to the invention also have the advantage of being conductive both in solution and in dry form, even after successive rinses. These films are thus capable of dual electrical conduction, i.e. they are intrinsic conductors, as a result of their structure of polyaromatic type, and may be doped with the electrolytic substances present in their synthetic solution or inserted subsequently. According to the invention, it is thus possible to add doping agents to the synthetic medium of the film. These doping agents may be those conventionally used by a person skilled in the art to dope organic polymers.

In addition, the process of the present invention makes it possible to manufacture organic films that can simultaneously provide protection against the external medium, for example against corrosion, and/or offer a grafted coating that has organic functional groups such as those mentioned above and/or promote or maintain electrical conductivity at the surface of the treated objects.

Furthermore, the films of the present invention have the advantage that it is possible to grow on them electro-initiated polymer films, in the manner performed on metal surfaces. For example, it is possible to obtain the electro-grafting of vinyl monomers, for instance methyl methacrylate (MMA) on a surface precoated with an organic film that is the subject of the present invention. Specifically, it is known from patent applications EP-A-038 244 and WO-A-0 029 043, and also from references [3] and [4] indicated in the attached list of references, that the electro-grafting of vinyl monomers such as MMA can take place only on electrically conductive surfaces.

According to the present invention, a coating such as a coating of metal, of conventional conductive polymers, of charged polymers, etc. can therefore be electro-deposited on the film of the present invention by any technique known to those skilled in the art. In addition, all types of compounds, such as conductive films based on aryldiazonium, vinyl monomers, strained-ring molecules, etc. may be electro-grafted onto the film of the present invention also by any technique known to those skilled in the art.

According to the invention, when the new layer deposited is itself conductive, for example in the case of the electro-deposition of metals, conductive polymers or organic films using aryldiazonium salts or carboxylic acid salts, etc., the process of the present invention may be repeated on the abovementioned new layer.

It is thus also possible, by means of the present invention, to manufacture multilayer conductive structures, for example by using organic intercalating films based on the present invention.

According to the invention, a layer of an insulating polymer may also be deposited on the conductive film. Thus, the process of the present invention may also comprise a step of depositing an insulating film on the said conductive organic film. Examples of insulating polymers are given in the examples below. Other polymers such as these may, of course, be used in the context of the present invention.

The organic films obtained according to the present invention constitute a grafted protective coating, which withstands anodic potentials above the corrosion potential of the conductive surface to which they have been electro-grafted.

It is thus possible, according to the present invention, by means of the prior deposition of a conductive organic layer based on aryldiazonium salts, to produce deposits by anodic polarization on the surface of an object, whereas it was impossible on the surface of this object without the presence of the film of the present invention, since the surface of this object has been oxidized during the attempted deposition by anodic polarization. It is thus possible to deposit, for example, conventional conductive polymers or certain vinyl monomers, with inverse demand, i.e. by anodic electropolymerization, on objects consisting, in bulk or at the surface, of non-noble metals, which was impossible with the techniques of the prior art.

The process of the present invention may thus also comprise, for example, a step of depositing a film of a vinyl polymer by electropolymerization of the corresponding vinyl monomer on the conductive polymer film.

The process of the present invention may also be used to produce very strong organic/conductor interfaces. Specifically, the organic films of the present invention are conductive at any thickness. When they are sparingly crosslinked, they can constitute "conductive sponges", with a conductive surface whose apparent area is very much greater than the original surface onto which they are grafted. This makes it possible to produce a much more dense functionalization than on the starting surface onto which they are grafted.

The process of the present invention also makes it possible to improve the polymer/metal interface strength via interlocking networks. Specifically, according to the invention, it is possible, for example, to electropolymerize monomers, such as vinyl monomers, strained-ring molecules, precursors of other conductive polymers, etc., on the films of the present invention.

The start of the polymerization of this other polymer takes place within the very film of the present invention. This thus ensures interpenetration due to the other electro-initiated polymer with the organic layer of the present invention, and thus great strength of the interface between the conductive organic layer of the present invention and the polymer film electro-grafted onto this layer.

As a result, the present invention makes it possible to establish two very strong metal/electro-grafted diazonium layer and electro-grafted diazonium layer/polymer interfaces, where one direct polymer/metal interface would have been less strong via the processes of the prior art.

The present invention consequently makes it possible to produce grafted and conductive organic coatings, of adjustable thickness, on conductive or semiconductive surfaces.

The process of the present invention can be used, for example, to protect non-noble metals against external attack, such as those produced by chemical agents, such as corrosion, etc. This novel protection imparted by means of the process of the invention can, for example, prove to be particularly advantageous in connections or contacts, where the electrical conduction properties are improved and/or conserved.

In another application, the process of the present invention can be used, for example, for the manufacture of localized conductive coatings, for example for microelectronics, its techniques and its applications, such as new generations of inkjet printing heads, electronic sensors that can be used in vivo, in surgery or by implantation, biochips, microfluidics, lab-on-chips, etc.

In another application, the process of the present invention can be used, for example, for the manufacture of conductive organic layers whose electrical potential can be controlled afterwards, to serve to govern, at the molecular scale, various physicochemical properties of these films. This placing of the conductive film under potential can serve, for example, to initiate any electrochemical reaction known to those skilled in the art, for instance the electro-deposition of metals or polymers, which may or may not be charged, or alternatively the oxido-reduction of any redox couple having a standard potential that is compatible with the stability of the film, or alternatively, for example, the electro-expulsion, via electrostatic repulsion, of charged species such as polymers, molecules, atomic ions, etc., deposited on the surface of the conductive film, for example by non-specific adsorption.

In another application, the process of the present invention can be used, for example, for the manufacture of covering grafted sublayers, on all types of conductive or semiconductive surfaces, on which all types of functionalizations may be performed, and especially those using electrochemistry, for instance the electro-deposition or electro-grafting of vinyl monomers, of strained rings, of diazonium salts, of carboxylic acid salts, of alkynes, of Grignard derivatives, etc. This sublayer can thus constitute a high-quality finishing for the remetallization of objects, or for the electro-grafting of functional groups, for example in the fields of biomedics, biotechnology, chemical sensors, instrumentation, etc.

In addition, according to the invention, the organic films based on diazonium salts of the present invention are conductive at any thickness. Thus, when they are sparingly crosslinked, they can constitute "conductive sponges", with a conductive surface whose apparent area is very much greater than the original surface onto which they are grafted. This makes it possible to envisage functionalization densities that are higher than on the starting surface onto which they are grafted. This is particularly advantageous, for example, in the attachment of molecules with biological activity, for example in the biomedical or biotechnological field, in the field of encapsulating molecules or alternatively in the field of the electro-grafting of polymers. Specifically, the conduction in the thickness of the conductive organic layer ensures initiation of the polymerization within this very layer, and thus interpenetration due to the polymer electro-grafted with the organic layer of the present invention. This thus also ensures high specific strength of the interface between the conductive organic layer and the polymer film electro-grafted onto this layer, which are advantageous for applications in the adhesion field.

The present invention may thus be used, for example, in the manufacture of an encapsulating coating for electronic components, in the manufacture of a hydrophilic coating, in the manufacture of a biocompatible coating, for the manufacture of a film that can be used as an adhesion primer, as an organic post-functionalization support, as a coating with optical absorption properties or as a coating with stealth properties.

Other characteristics and advantages of the present invention will also become apparent to a person skilled in the art on reading the examples below, given as non-limiting illustrations, with reference to the attached figures.

BRIEF DESCRIPTION OF THE FIGURES

In these figures, Tr (%) indicates the percentage transmittance, $S_a$ indicates the aromatic substitutions (FIG. 2), $N_o$ indicates the wavenumber in $cm^{-1}$, CPS indicates the number of counts per second (number of electrons of a given energy during the recording of the XPS spectrum), $\in_1$ indicates the binding energy in eV, U (V/Ag$^+$/Ag) indicates the potential in volts of the surface on which the film is electro-deposited relative to an Ag$^+$/Ag reference electrode, and I indicates the current in mA.

EXAMPLES

Example 1

Control of the Thickness of Applied-Potential Films

In a first experiment, voltammetric responses of a solution containing $10^{-4}$ mol/l of 4-nitrophenyldiazonium tetrafluoroborate in acetonitrile, in the presence of $5\times10^{-2}$ mol/l of TEAP, on a platinum electrode are measured. The counter-electrode is also a platinum electrode and the reference electrode is an Ag/Ag$^+$ electrode.

The results of this first experiment are shown in the attached FIG. 1. In this figure the wave "A" is that corresponding to the electro-reduction of the diazonium salt, the wave "B" is due to the reduction of the nitro groups and the dotted curve is that of TEAP alone.

In a second experiment, a platinum electrode is polarized, under voltammetric conditions, in a solution containing $10^{-3}$ mol/l of 4-nitrophenyldiazonium tetrafluoroborate and $5\times10^{-2}$ mol/l of tetraethylammonium perchlorate (TEAP) in acetonitrile.

The potential sweeps are applied from +0.3 V/(Ag$^+$/Ag) to −2.9 V/(Ag$^+$/Ag), at −200 mV/s.

After recovering and rinsing the platinum electrodes, in water and then in acetone for 5 minutes with ultrasound each time, homogeneous organic films are observed. A thickness of 3 nm after one sweep, 30 nm after 10 sweeps and 100 nm after 20 sweeps is measured.

Figure 2:
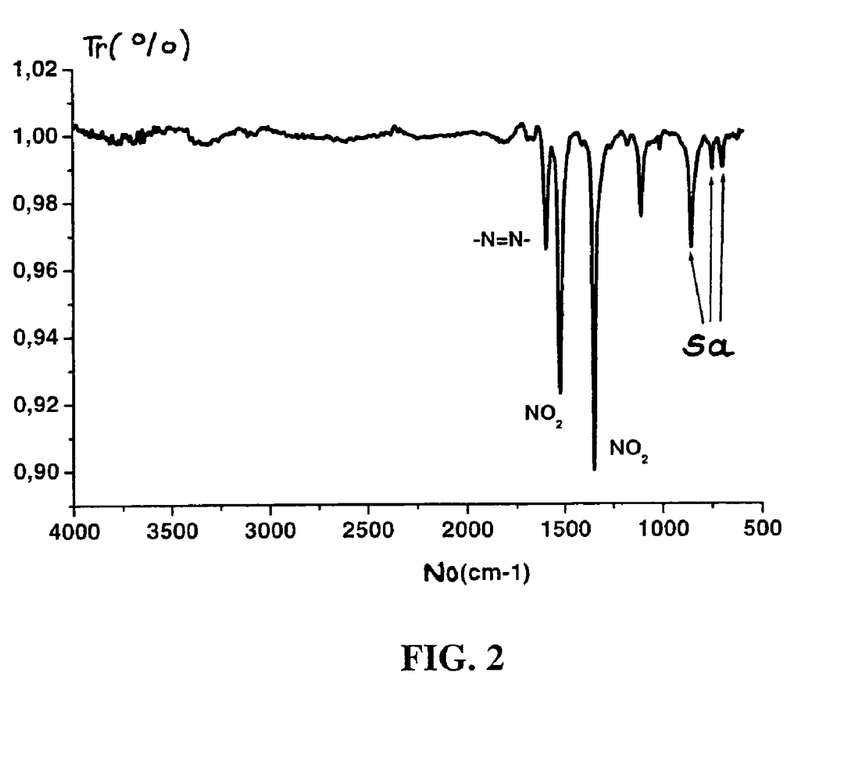
FIG. 2: Infrared spectrum of a 30 nm organic film obtained on a platinum electrode by electro-reduction of a solution of 4-nitrophenyldiazonium tetrafluoroborate in acetonitrile.
Figure 3:
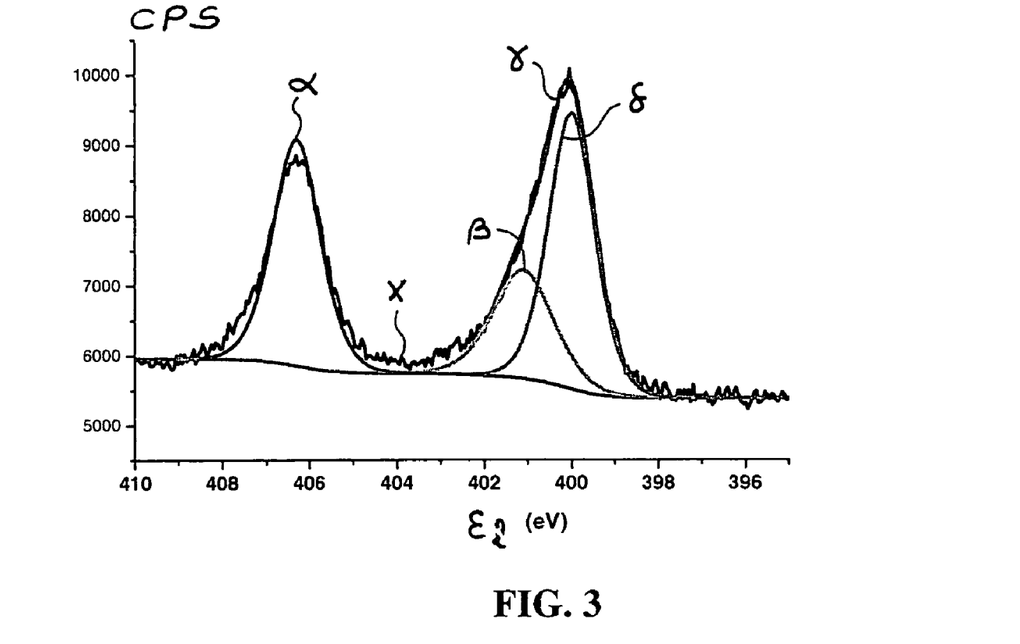
FIG. 3: XPS spectrum of a 30 nm organic film obtained on a platinum electrode by electro-deposition of a solution of 4-nitrophenyldiazonium tetrafluoroborate in acetonitrile.

The infrared (IR) and XPS (N1s region) spectra of the 30 nm sample are given in the attached FIGS. 2 and 3, respectively. They show the presence of an organic film still comprising nitro groups (IR), at least a portion of which has been modified, since two types of nitrogen are identified (XPS). Besides the nitrogens measured at 406.3 eV, which correspond to the nitro groups, a very intense component is observed at about 400 eV, which may correspond to nitrogenous groups, which are probably reduced (NH$_2$ or N=N) and involved in the bonds between aromatic rings of successive layers.

The analysis of the global XPS spectrum reveals a stoichiometry approaching $C_{12}O_{2.6}N_{2.6}$.

In FIG. 2, the peaks at 1350 and 1526 cm$^{-1}$ are due to the nitro groups, the peak observed at 1599 is due to diazo bridges (—N=N—) and the peaks at 702, 752 and 856 cm$^{-1}$ are due to aromatic substitutions (ortho, meta and para). These latter peaks suggest that the radicals derived from the reduction of the diazonium salts have reacted with the aromatic rings, and that some of these radicals are species of the type R'—N=N. Such structures would be compatible with the formation of a thick film, whose thickness grows with the number of voltammetric sweeps, i.e. with the charge that has passed through the circuit.

Example 2

Control of the Thickness of Applied-Potential Films

A platinum electrode is polarized, under voltammetric conditions, in a solution containing $10^{-3}$ mol/l of 4-bromobenzyldiazonium tetrafluoroborate and $5\times10^{-2}$ mol/l of tetraethylammonium perchlorate (TEAP) in acetonitrile.

Figure 9:
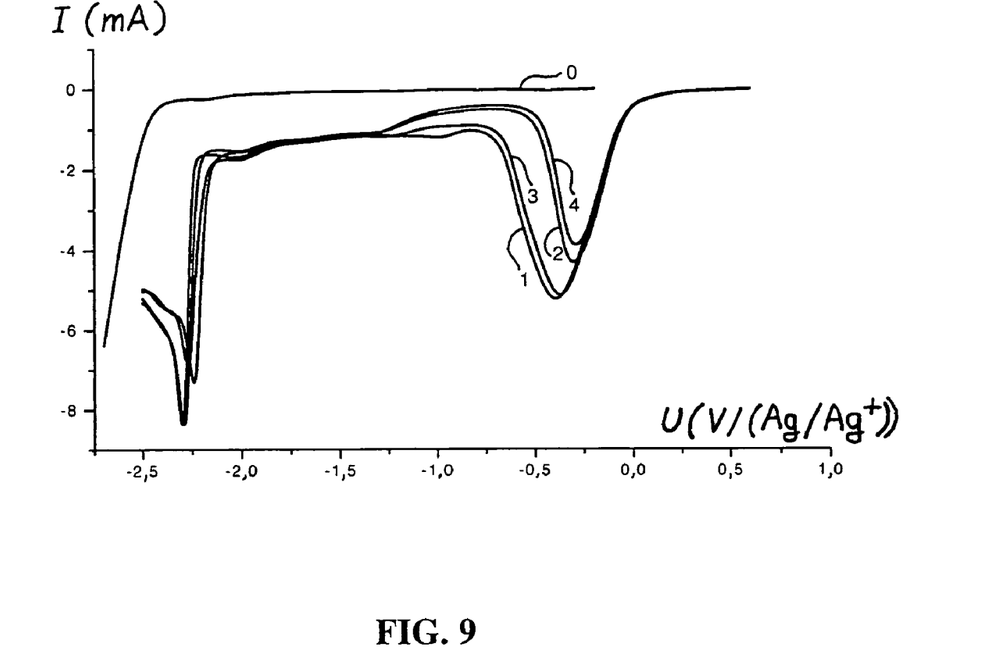
FIG. 9: Voltammograms of potential sweeps in a solution of 4-bromobenzyldiazonium tetrafluoroborate in acetonitrile, obtained by polarization of a platinum electrode.

The potential sweeps are applied from +0.5 V/(Ag$^+$/Ag) to −2.5 V/(Ag$^+$/Ag), at −20 mV/s, as indicated in FIG. 9.

This FIG. 9 shows voltammograms obtained for the first four potential sweeps, referenced 1, 2, 3 and 4, respectively, of the solution of 4-bromobenzyldiazonium tetrafluoroborate in acetonitrile. The reference 0 indicates the result obtained with the solution containing only the support electrolyte.

The peak at about −0.25 V/(Ag$^+$/Ag) is that of the reduction of the diazonium salt, the one at about −2.25 V/(Ag$^+$/Ag) is due to the reduction of the benzyl groups grafted onto the surface.

It is observed that the intensity of the latter peak increases as a function of the number of sweeps, which reflects the thickening of the film.

After recovering and rinsing the platinum electrodes, in water and then in acetone for 5 minutes with ultrasound each time, homogeneous organic films are observed. A thickness of 5 nm after one sweep, 50 nm after 10 sweeps and 150 nm after 20 sweeps is measured.

Example 3

Control of the Thickness of Applied-Current Films

A platinum electrode is polarized, under intentiostatic conditions, in a solution containing $10^{-3}$ mol/l of 4-bromobenzyldiazonium tetrafluoroborate and $5\times10^{-2}$ mol/l of tetraethylammonium perchlorate (TEAP) in acetonitrile.

0.2 µA current pulses with a duration of one second, followed by a rest period of 3 seconds, are applied.

After recovering and rinsing the platinum electrodes, in water and then in acetone for 5 minutes with ultrasound each time, homogeneous organic films are observed. A thickness of 3 nm after one pulse, 30 nm after 10 pulses and 100 nm after 20 pulses is measured.

Example 4

Electrical Conduction of the Films

The strips covered with an electro-grafted film of Example 1 are redipped into a solution of acetonitrile alone, containing $5\times10^{-2}$ mol/l of tetraethylammonium perchlorate (TEAP). They are again used as cathodes, and are subjected to a series of sweeps between −0.1 V/(Ag$^+$/Ag) and −2.0 V/(Ag$^+$/Ag), at speeds of between −50 and −500 mV/s.

Figure 4:
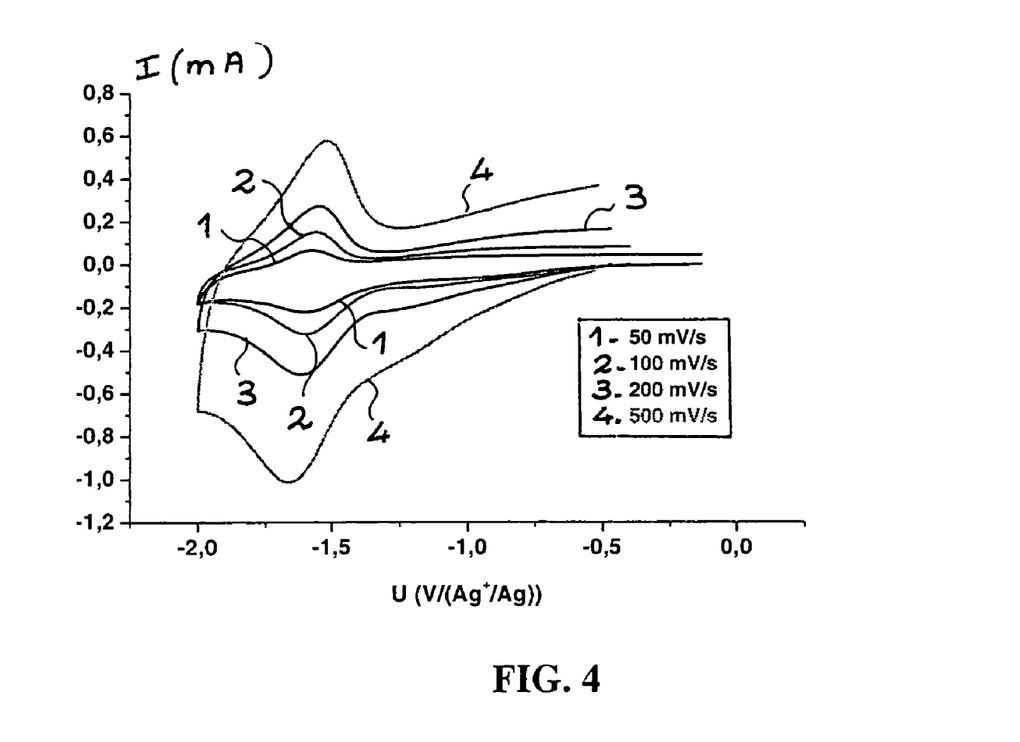
FIG. 4: Voltammogram of the strips of Example 1 (30 nm thick) dipped into acetonitrile in the presence of a support electrolyte.

The results of this figure are described in the attached FIG. 4. The key to this figure shows the correspondence between the references of the curves and the applied sweep speed.

The characteristic waves of the nitro groups are observed, even on the samples of high thickness, i.e. 30 nm and greater, which would be impossible if the film was not conductive.

Two additional factors make it possible to prove that they are indeed nitro groups of the grafted film, and that the nitro groups are reduced in bulk, and not just in the region of the platinum/organic interface.

Firstly, the intensities of the voltammetric waves vary linearly with the sweep speed: this shows that these nitro groups are not subject to diffusion, but behave as if they were adsorbed onto the surface of the electrode.

Next, when the sweeps are multiplied on a given sample, it is observed that the peaks end up by reducing in intensity, revealing that a coupled chemistry consumes the products of reduction of the nitro groups, which are finally not all restored by the anodic wave as the sweeps are performed.

We performed, for two film thicknesses, 6 and 30 nm, a number of sweeps sufficient to obtain flat voltammograms.

Figure 5:
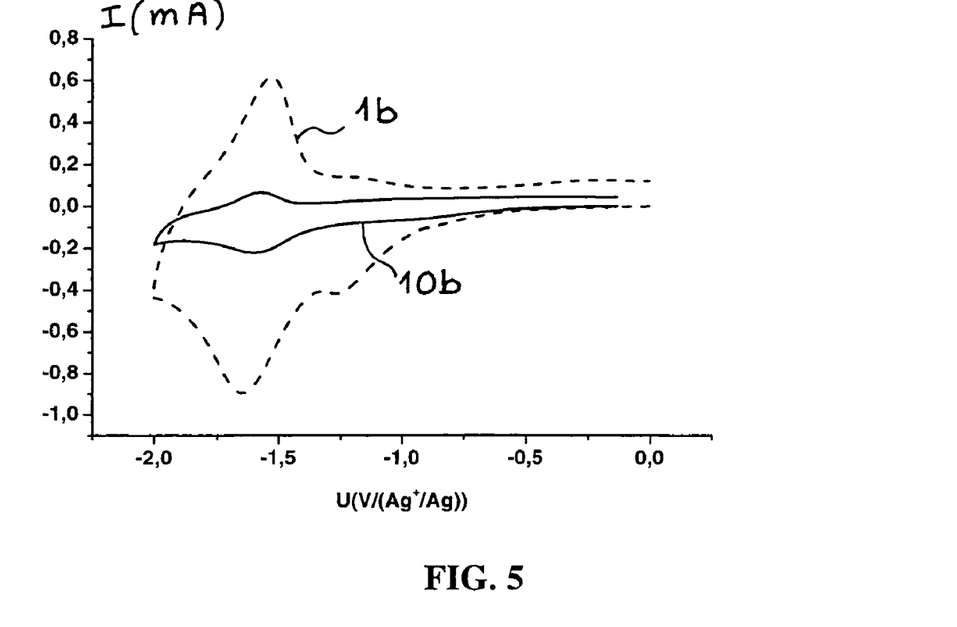
FIG. 5: Voltammogram of the strips of Example 1 dipped into acetonitrile in the presence of a support electrolyte after one sweep (1b) (dotted line) and after 10 sweeps (10b) (solid line).

The results are shown in the attached FIG. 5. In this figure, the dotted-line curve (1b) indicates the voltammogram of a strip of Example 1 (30 nm thick) dipped into acetonitrile in the presence of support electrolyte after one sweep, and the solid-line curve (10b) indicates the voltammogram of the same strip dipped into acetonitrile in the presence of support electrolyte after 10 sweeps.

By integrating the voltammetric curves, we were able to determine the amount of charge consumed to reduce the nitro groups. This gives:

| | |
|---|---|
| Thickness 6 nm: | $Q = 6$ nm $= 216$ $\mu C/cm^2$; |
| Thickness 30 nm: | $Q = 30$ nm $= 1058$ $\mu C/cm^2$. |

It is thus found that the amount of charge consumed to reduce the nitro groups is proportional to the thickness: $Q(30\ nm)/Q(6\ nm)\ 4.9=30/6$.

This is compatible with a reduction of the nitro groups in the presence of any thickness of the film, and thus with the fact that the film is electrically conductive.

Complementary results make it possible to assert the disappearance of the nitro groups in the volume of the film under the electrochemical action.

Figure 6:
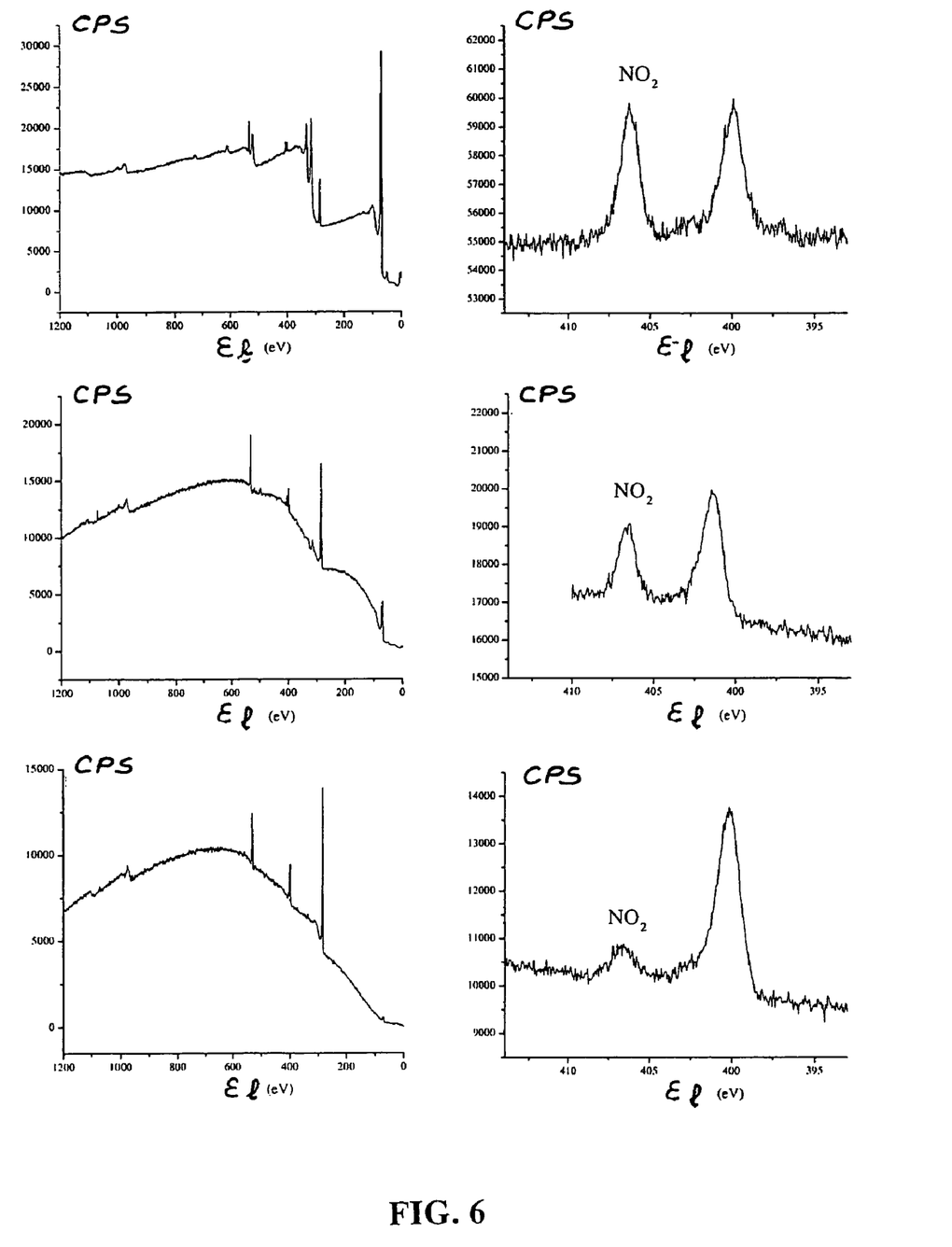
FIG. 6: Global XPS spectra (left-hand graphs) (all core levels) and nitrogen core level spectra (right-hand graphs) relating to the removal of the $NO_2$ groups from the organic film obtained by electro-grafting of nitrophenyldiazonium tetrafluoroborate, by subsequent electrochemical reduction. At the top, 4 nm thin film in its initial manufacturing state; at the centre a 30 nm film which has undergone a cycle of electrochemical reduction of the nitro groups during its synthesis; at the bottom, a 30 nm film which has undergone 4 cycles of electrochemical reduction of the nitro groups.
Figure 7A:
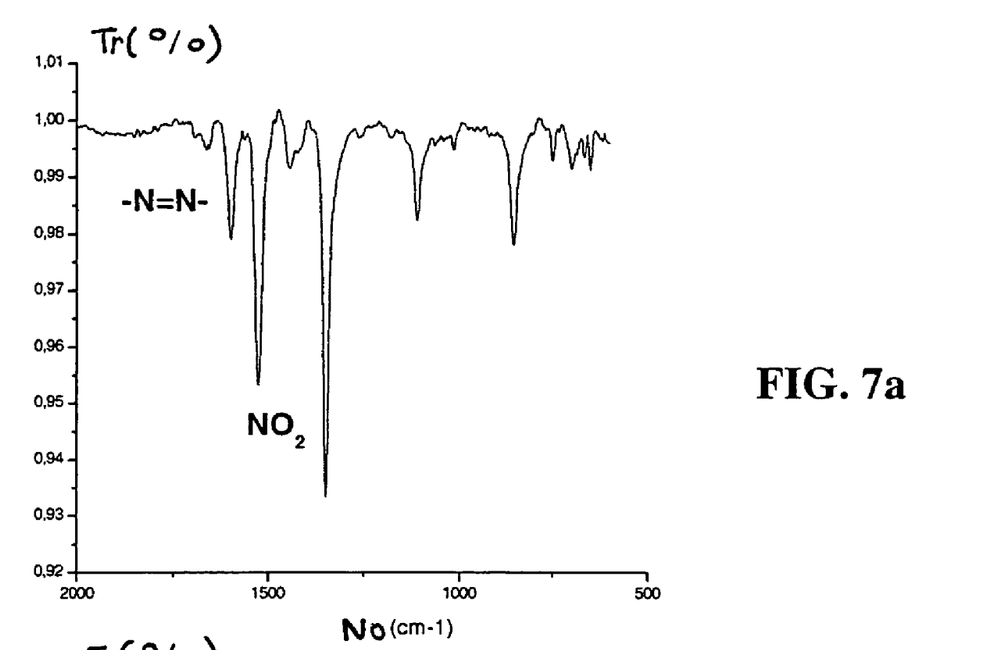
FIG. 7a): Initial spectrum of a 30 nm organic film obtained by electro-grafting of para-nitrophenyldiazonium tetrafluoroborate.
Figure 7B:
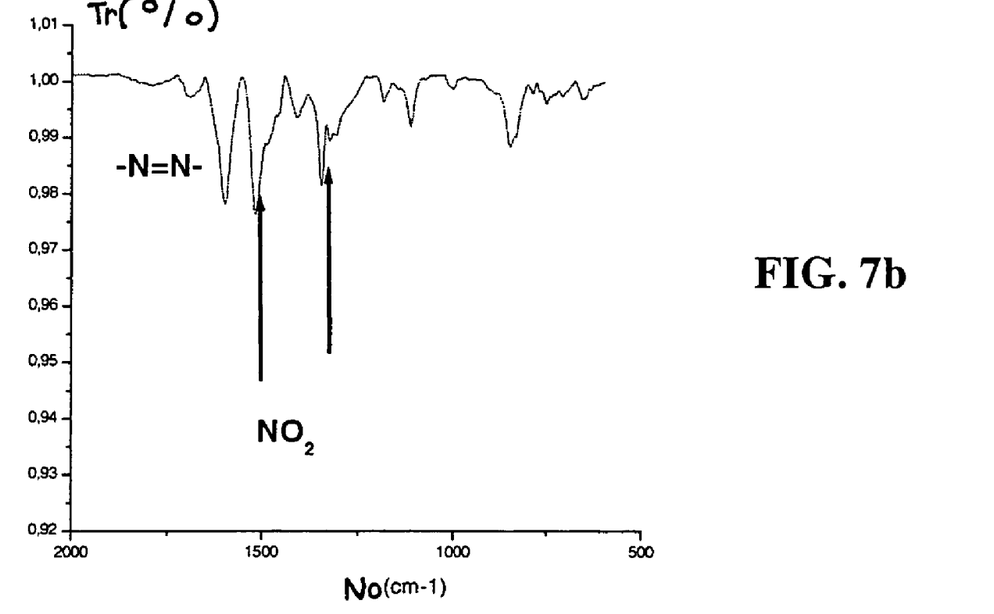
FIG. 7b): Spectrum of the film of FIG. 7a) after electrochemical removal of the nitro groups.

The XPS spectra shown in the attached FIG. 6, and the IRRAS spectra shown in the attached FIGS. 7a) and 7b), of an organic film obtained by electro-reduction of nitrophenyldiazonium tetrafluoroborate, before and after electrochemical removal of the nitro groups, give these results.

FIG. 6 shows the global spectra (left-hand graphs) (all core levels) and core level spectra of nitrogen (right-hand graphs) (nitro at 406 eV, polymer at 400 eV) relating to the removal of the $NO_2$ groups from the organic film obtained by electro-grafting nitrophenyldiazonium tetrafluoroborate, by subsequent electrochemical reduction. At the top, 4 nm thin film in its initial state of manufacture; in the centre, 30 nm film which has undergone a cycle of electrochemical reduction of the nitro groups during its synthesis; at the bottom, 30 nm film which has undergone 4 cycles of electrochemical reduction of the nitro groups. The nitro signature has virtually disappeared. The disappearance of the nitro groups takes place without any loss of thickness of the film, as asserted by the envelopes of the global spectra and the visual examination of the film.

FIG. 7a) shows an initial spectrum of an organic film obtained by electro-grafting 30 nm para-nitrophenyldiazonium tetrafluoroborate, and FIG. 7b) shows a spectrum of the film of FIG. 7a) after electrochemical removal of the nitro groups.

The film has conserved its initial thickness, as asserted by the bands relating to the polymer skeleton and visual examination.

These results were obtained from 30 nm films electro-grafted by cyclic voltammetry, after 4 return cycles between $-0.2$ and $-2.0$ V/(Ag$^+$/Ag) at a speed of $-50$ mV.s$^{-1}$, on a platinum surface in the presence of a content of $10^{-3}$ M nitrophenyldiazonium tetrafluoroborate.

Example 5

Electrical Conduction of the Films

A platinum electrode is polarized under voltammetric conditions, in a solution containing $10^{-3}$ mol/l of 4-bromobenzyldiazonium tetrafluoroborate and $5 \times 10^{-2}$ mol/l of tetraethylammonium perchlorate (TEAP) in acetonitrile.

The potential sweeps are applied from $+0.5$ V/(Ag$^+$/Ag) to $-2.5$ V/(Ag$^+$/Ag), at $-20$ mV/s, as indicated in FIG. 9.

A rapid gain in thickness as a function of the number of potential sweeps is observed, as indicated in Example 2, whereas the surface is manifestly not passivated: the peak at about $-0.25$ V/(Ag$^+$/Ag) corresponding to the electro-reduction and grafting of the diazonium salts is still present, whereas a covering film is observed on the strip.

This shows that the growth of the film takes place on the film itself, which is thus conductive.

Example 6

Electro-Grafting of a Vinyl Polymer onto a Conductive Diazo Film

A strip covered with an electro-grafted film of Example 1, and having a thickness of 3 nm, is redipped into a solution of methyl methacrylate (MMA) at 2 mol/l in acetonitrile containing $5 \times 10^{-2}$ mol/l of tetraethylammonium perchlorate (TEAP). It is again used as the cathode, and is subjected to a series of 10 sweeps between $+0.3$ V(Ag$^+$/Ag) and $-2.7$ V(Ag$^+$/Ag), at a sweep speed of $-100$ mV/s.

The formation of a polymethyl methacrylate (PMMA) film 80 nm thick is observed.

Figure 8:
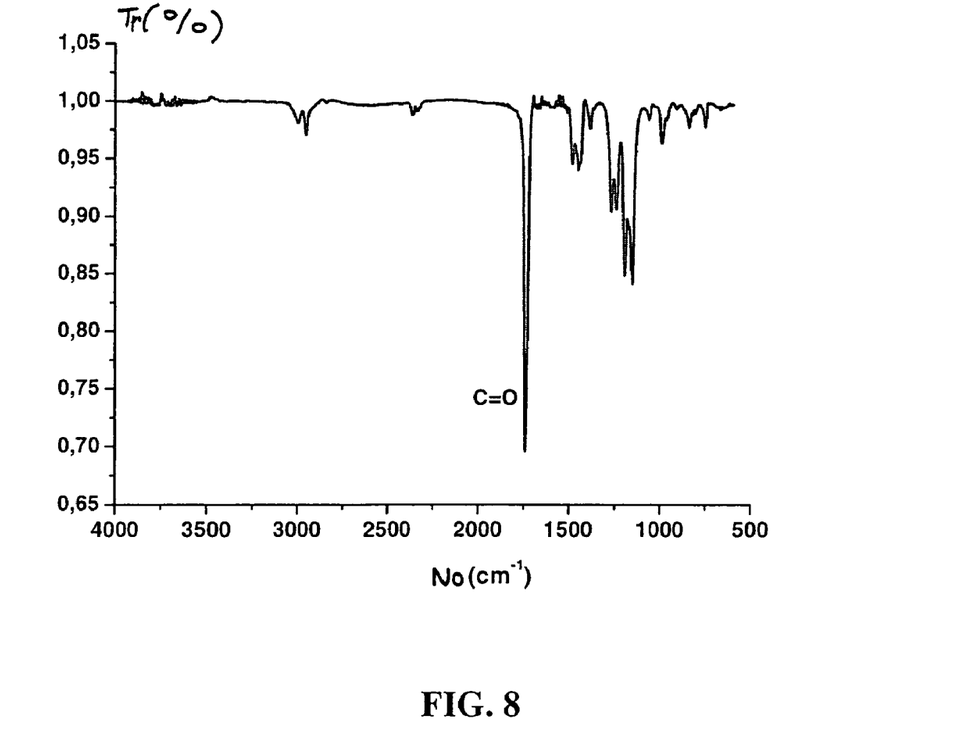
FIG. 8: Infrared spectrum of a PMMA film 80 nm thick obtained on a platinum electrode precoated with a 3 nm conductive organic film, obtained by electro-reduction of diazonium salts.

The attached FIG. 8 shows the infrared spectrum making it possible to identify the structure of the polymer formed, and to observe the disappearance of the nitro groups. The peak at 1740 cm$^{-1}$ is due to the ester groups of the PMMA (C=O).

Figure 10:
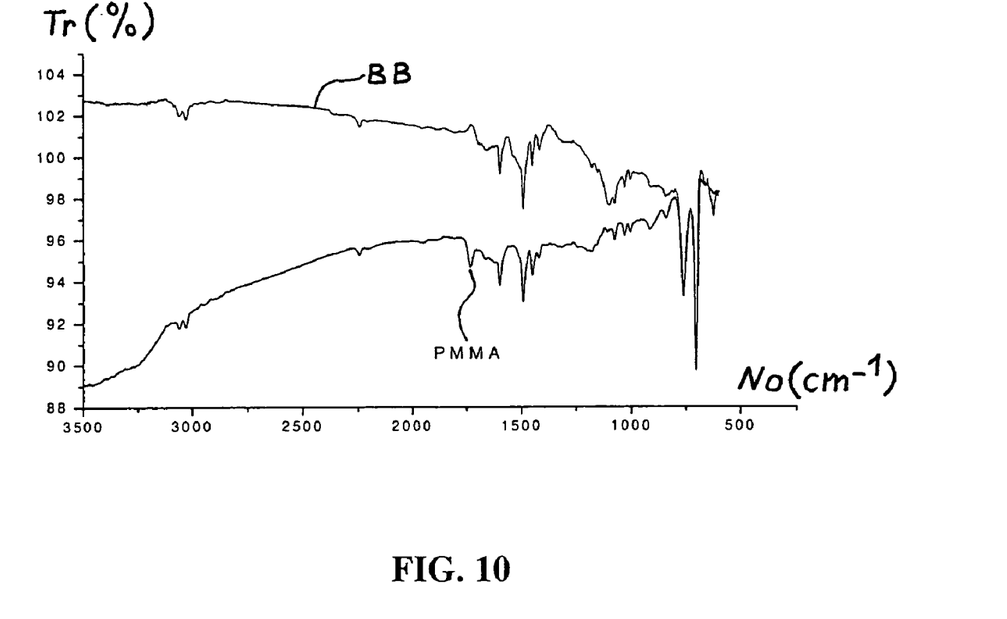
FIG. 10: Reflection spectrum (Tr (%)) as a function of the wavenumber $N_o$ in $cm^{-1}$: in this figure, the top spectrum is that of a bromobenzyl (BB) film grafted onto a metallic gold surface according to the process of the present invention, and the bottom spectrum corresponds to the above sample onto which is grafted a PMMA film.

FIG. 10 is an infrared spectrum (TR (%)) as a function of the frequency (F) (cm$^{-1}$). In this figure, the top spectrum (BB) is that of a bromobenzyl film grafted onto a gold surface according to the process of the present invention using 4-bromobenzyldiazonium tetrafluoroborate, and the bottom spectrum (PMMA) corresponds to the preceding sample onto which is grafted a PMMA film.

As described in the prior art, for example in patent applications EP-A-038 244 and WO-A-00 29043, or alternatively in references [2], [3] and [4] indicated in the attached list of references, the production of an electro-initiated PMMA film proceeds via a mechanism of Michael addition on MMA, in which the nucleophile is the negatively polarized surface. In particular, this mechanism is possible only if the surface is electrically conductive.

The production of a PMMA film on an electro-grafted diazo film is thus compatible with the fact that the diazo film of the present invention is electrically conductive: in particular, the chemical potential of this film may be controlled with a potentiostat, and its nucleophilicity adjusted. This is described in references [2], [3] and [4] indicated in the attached list.

Example 7

Interpenetration Between an Electro-Grafted Conductive Organic Film and an Electro-Grafted Vinyl Polymer Film On the same naked platinum surface as that used in Example 5, i.e. on a platinum surface that has not been covered beforehand with a conductive organic film, a protocol identical to that of Example 5 leads to the production of a PMMA film about 30 nm thick, i.e. much less than the 80 nm obtained on a platinum surface covered with a diazo film.

This result, which is reproducible, especially on other surfaces, is probably due to the fact that: (i) the diazo film is at least swollen with the synthetic solvent in which the electro-initiation of the vinyl compound is performed; (ii) the film is conductive throughout its thickness, as shown in Example 6 above.

Consequently, the growth of the PMMA chains takes place from the core of the diazo film, on a surface of higher apparent area. This thus gives rise to a higher degree of grafting, and thus to greater thicknesses. This reasoning is valid as long as the thicknesses are less than the length of the chains, i.e. less than about 100 nm in the case of electro-initiated PMMA.

Example 8

Electrical Conduction and Optical Properties of the Films

The above examples illustrate the electrical conductivity in solution of the organic films obtained from diazonium salts.

This example illustrates the electrical conductivity under dry conditions of diazonium organic films.

In this example, since the films are of low thickness, the measurements were taken via optical methods rather than via directly dielectric methods. Specifically, the dielectric measurements are performed with a mechanical contact between the film and a metal surface serving as a probe. In the case of thin films, the film may be pierced at the time of contact between the probe and the sample, the effect of which is to short-circuit the probe and the surface bearing the film. This accident, which is difficult to detect, has the consequence of being able to find any conductive coating. This type of measurement is therefore not always convincing.

In the present case, the refractive index (n) and the extinction coefficient (k) of the films of the present invention are measured by electrochemical impedance ellipsometric spectroscopy. The same measurements are also taken on vinyl polymer films of similar thicknesses, which are known to be insulating.

As shown by the results below, it is seen that:
the diazonium films give extinction coefficients k of the order of 0.4 to 0.5;
coefficients k of this order are the same as those of the coatings obtained using conductive polymers such as polypyrrole (k=0.5), etc.;
the coefficients k of insulating coatings of the same thickness as the coatings of the present invention are smaller by more than two orders of magnitude, k≈0.0 to 0.005.

Consequently, the measurement of the optical extinction coefficients k for different surfaces makes it possible very simply to order the said surfaces as a function of their electrically insulating or conductive nature, dispensing with a direct dielectric measurement which would raise implementation problems not directly linked to the invention.

The extinction measurements are performed by spectroscopic ellipsometry. To characterize the samples (thickness e, index n and extinction k), the inventors proceeded by regression of the ellipsometric measurements using a complex smoothing program with a non-dispersive law, and then with a Lorentz oscillator model. The coherence of the results was checked with the spectrophotometric measurements.

The optical extinction coefficients k were measured for two films obtained by electro-reduction of para-nitrophenyldiazonium tetrafluoroborate, and were compared with those of conductive coatings (gold, platinum, polypyrrole) and also with those of insulating coatings (PMAN, PMMA).

The measurements were taken on eight different samples, the characteristics of which are summarized in Table 1 below. Two separate series were analysed:
two PMAN films electro-grafted onto gold, of thickness 9 and 28 nm. These films are obtained by electro-reduction of a 2.5 M solution of meth-acrylonitrile in anhydrous acetonitrile on a gold electrode, in the presence of $5 \times 10^{-2}$ M of TEAP (tetraethylammonium perchlorate) as support electrolyte. The electro-reduction takes place under voltammetric conditions between −0.3 and −2.6 V/(Ag$^+$/Ag) at 100 mV/s, in non-separate compartments, with a platinum counterelectrode of large surface area. The different thicknesses are obtained by varying the number of voltammetric sweeps;
two films obtained by electro-reduction of a $10^{-3}$ M solution of para-nitrophenyldiazonium tetrafluoroborate (PNPD) in anhydrous acetonitrile on a platinum electrode, in the presence of $5 \times 10^{-2}$ M of TEAP (tetraethylammonium perchlorate) as support electrolyte. The potential sweeps are applied from +0.3 V/(Ag$^+$/Ag) to −2.9 V/(Ag$^+$/Ag), at −200 mV/s. Two films, with respective thicknesses of 3 nm (0101Pt6) and 30 nm (0101Pt14) are obtained by this protocol.

The index and extinction measurements on the organic samples are summarized in Table 1 below. For comparative purposes, the results of the measurements taken on insulating polymethacrylonitrile (PMAN) films 9 nm (MANAu15) and 28 nm (MANAu24) thick obtained by electro-grafting are also presented in this table.

Very low extinction coefficients are measured for the insulating vinyl films (k<0.02, whereas the organic films obtained by electro-reduction of para-nitrophenyldiazonium tetrafluoroborate give extinctions at least 10 times higher, which are characteristic of conductive coatings.

For comparative purposes, polypyrrole films with a thickness in the region of those of the samples measured (20 nm) have an extinction coefficient, k=0.3 to 0.5, measured under the same conditions, for an index of 1.5. Specifically, Arwin et al., in reference [5] of the attached list of references, measure on a polypyrrole film 22 nm thick on gold, an extinction coefficient k=0.3, for a refractive index n=1.45; Kim et al., in reference [6], measure an extinction coefficient k=0.3 and an index n=1.6 at λ=632.8 nm, for a polypyrrole film 47 nm thick; Kim et al., in reference [7], measure on a 54 nm polypyrrole film in oxidized form an index n=1.45 for an extinction coefficient k=0.28, and on a 47 nm film in reduced form an index n=1.6 for an extinction coefficient k=0.21; and Guedon et al., in reference [8], measure on a polypyrrole film on gold and for film thicknesses of between 7.5 and 20 nm, an index n=1.7 for an extinction coefficient k=0.3 to 0.633 nm.

TABLE 1

Optical characteristics of the samples

| Sample | Nature | θ(profilo) nm | θ(ellipso) nm | N | K |
|---|---|---|---|---|---|
| MANAu15 | Insulating | 9 | 5–6 | 1.5 | 0.02 |
| MANAu24 | Insulating | 28 | 24 | 1.5 | 0 |
| 0101Pt6 | Conductive | 3 | — | 1.9 | 0.1 |
| 0101Pt14 | Conductive | 30 | 25–30 | 0.9 | 0.5 |

It is thus found that the films obtained by electro-reduction of aryldiazonium salts do indeed have the optical characteristics of conductors, and absorb considerably.

Example 9

Bilayer of Conductive Organic Films

This example illustrates the fact that it is possible to produce organic multilayers from diazonium salts of different nature by using the process of the present invention.

A strip covered with an electro-grafted film of Example 1, and having a thickness of 3 nm, is redipped into a 4-bromophenyldiazonium tetrafluoroborate solution at $10^{-3}$ mol/l in acetonitrile containing $5 \times 10^{-2}$ mol/l of tetraethylammonium perchlorate (TEAP). It is again used as cathode, and is subjected to a series of 10 sweeps between +0.3 V(Ag$^+$/Ag) and −2.7 V(Ag$^+$/Ag) at a sweep speed of −100 mV/s.

The formation of a conductive organic film is observed.

The thickness measurement reveals a film of about 15 nm. The XPS spectrum of this film shows the presence of bromine, whereas the signature of the nitro groups has disappeared, which is in agreement with the formation of an organic film more than 10 nm thick on the surface of the first conductive film.

Example 10

Optically Absorbent Coating

The optical absorption properties of the films of the invention are illustrated herein.

From the measurements of Example 8 above, the values of the coefficients of reflection (R), of transmission (T) and of loss (P) of 560 nm diazo films may be extracted. They are summarized in Table 2 below.

The same measurements were also taken on films of insulating polymers obtained by electro-grafting of vinyl compounds on gold, and are shown in Table 3 below.

TABLE 2

Coefficients of reflection (R), of transmission (T) and of loss (P) of diazo films on platinum, at 560 nm

| | At 560 nm | | |
|---|---|---|---|
| Sample | R (%) | T (%) | P (%) |
| 0101Pt14 | 45.72 | 0.02 | 54.26 |
| 0101Pt6 | 57.32 | 0.02 | 42.66 |

TABLE 3

Coefficients of reflection (R), of transmission (T) and of loss (P) of polymethacrylonitrile films on gold, at 560 nm

| | At 560 nm | | |
|---|---|---|---|
| Sample | R (%) | T (%) | P (%) |
| MANAu 15 | 81.32 | 0.02 | 18.66 |
| MANAu 24 | 75.45 | 0.03 | 24.51 |
| Au 2301 | 77.54 | 0.0207 | 22.44 |
| Au 2401 | 84.19 | 0.04 | 15.77 |

Comparison of the two tables shows that the layer of organic film obtained from diazonium salts is about two times less reflective as both the insulating organic layers and the initial metal surfaces. At the same time, the optical transmissions are similar, and only the level of losses increases in passing from the samples in Table 3 to those in Table 2.

The optical absorption properties of the coatings of the invention are thus demonstrated. Consequently, by appropriately adjusting the thickness, these coatings can be used to make a coating with stealth properties.

REFERENCES

[1] Mac Diamid et al., U.S. Pat. No. 4,640,749 (1985) and the references given therein.

[2] C. Bureau, G. Deniau, P. Viel, G. Lécayon and J. Delhalle, Journal of Adhesion, 58 (1998) 101.

[3] C. Bureau and G. Lécayon, Journal of Chemical Physics, 106 (1997) 8821.

[4] C. Bureau and J. Delhalle, Journal of Surface Analysis, 6 (1999) 159.

[5] Arwin et al., Synthetic Metals 6 1983: "Dielectric Function of Thin Polypyrrole and Prussian Blue Films by Spectroscopie Ellipsometry.

[6] Kim et al., Journal of the Electrochemical Society, 138 (11), 1991: "Real Time Spectroscopic Ellipsometry: In Situ Characterization of Pyrrole Electropolymerization"

[7] Kim et al., Bulletin of the Korean Chemical Society, 17(8), 1996: "Polypyrrole Film Studied by Three-Parameter Ellipsometry".

[8] Guedon et al., Analytical Chemistry, 22, 6003-6009, 2000: "Characterization and Optimization of a Real-Time, Parallel, Label-Free, Polypyrrole-Based DNA Sensor by Surface Plasmon Resonance Imaging".

The invention claimed is:

1. A process for grafting and growing a conductive organic film onto an electrically conductive or semiconductive surface by electro-reduction of at least one diazonium salt that is a precursor of the organic film, the process comprising grafting and growing the film by application of at least one protocol consisting of the electro-reduction of the at least one diazonium salt onto the surface, the surface being electrically polarized by applying a variable potential ranging from +0.3 V to −2.9 V relative to an Ag$^+$/Ag reference electrode, wherein the organic film is a covering film.

2. The process according to claim 1, wherein, in the at least one protocol consisting of the electro-reduction, the potential of the surface is applied so as to form a triangular potential pulse.

3. The process according to claim 1, wherein, in the at least one protocol consisting of the electro-reduction, the potential of the surface is applied so as to form a square potential pulse.

4. The process according to claim 1, wherein the diazonium salt is a diazonium salt or a mixture of diazonium salts of generic formula R'—N$_2^+$, X$^-$, in which R' contains one or more aromatic ring(s) and/or one or more unsaturated group(s) capable of delivering conductive structures, and X$^-$ is a counterion.

5. The process according to claim 1, wherein the diazonium salt is a diazonium salt or a mixture of diazonium salts of generic formula R'—N$_2^+$, X$^-$, wherein X$^-$ is a counterion and R' comprises an organic or mineral group selected from the group consisting of: nitro, fluoro, bromo, chloro, iodo, thiocyanato, sulphate, sulphonate, sulphonium salts, phosphate, phosphonate, phosphonium salts, diazonium salts, amine, ammonium, alcohol, aldehyde, ketone, carboxylic acid, ester, amide, nitrile, anhydride, acid halide, alkyl, alkenyl, alkynyl, aryl, naphthyl, anthryl, pyrryl and polyaromatic groups of higher degree, and wherein the alkyl, alkenyl, alkynyl, aryl, naphthyl, anthryl, pyrryl and polyaromatic groups of higher degree include a group selected from the group consisting of: nitro, fluoro, bromo, chloro, iodo, thiocyanato, sulphate, sulphonate, sulphonium salts, phosphate, phosphonate, phosphonium salts, diazonium salts, amine, ammonium, alcohol, aldehyde, ketone, carboxylic acid, ester, amide, nitrile, anhydride, and acid halide.

6. The process according to claim 1, wherein the diazonium salt is selected from a tetrafluoroborate, halide, sulphate, phosphate, carboxylate, perchlorate, or hexafluorophosphate salt or a mixture thereof.

7. The process according to claim 1, wherein the electro-reduction is performed in a medium in which the diazonium salt is at a concentration of between $10^{-4}$ and 1 mol/l.

8. The process according to claim 1, wherein the diazonium salt comprises one or more aromatic heterocycle(s) and the electro-reduction is performed in a synthetic medium including metal salts.

9. The process according to claim 1, wherein the electro-reduction of the diazonium salt is performed in a medium comprising a support electrolyte.

10. The process according to claim 1, wherein the surface is selected from the group consisting of a surface of a noble metal, a surface containing reducible oxide, a graphite surface, a conductive or semiconductive organic surface, a surface of an alloy, a surface of one or more conventional conductive polymer(s), a surface of an intrinsic or doped semiconductor, and combinations thereof.

11. The process according to claim 10, wherein the surface is a surface of one or more conventional conductive polymer(s) based on pyrrole, aniline, thiophene, ethylenedioxythiophene, acetylene, or polyaromatics.

12. The process according to claim 1, further comprising a second step of grafting and growing the film by electro-reduction of a second diazonium salt that is different from said at least one diazonium salt.

13. The process according to claim 1, further comprising a step of depositing an insulating film on the conductive organic film.

14. The process according to claim 1, further comprising a step of depositing a film of a vinyl polymer by electropolymerization of the corresponding vinyl monomer on the conductive organic film.

15. The process according to claim 1, wherein the film is included in a multilayer film.

16. The process according to claim 1, wherein the film is included in a chemical sensor.

17. The process according to claim 1, wherein the film is included in an encapsulating coating for electronic components.

18. The process according to claim 1, wherein the film is included in a hydrophilic coating.

19. The process according to claim 1, wherein the film is included in a biocompatible coating.

* * * * *